US012617470B2

(12) United States Patent
Vescovi

(10) Patent No.: US 12,617,470 B2
(45) Date of Patent: May 5, 2026

(54) NOSE FOR A RACING CAR, RACING CAR COMPRISING SUCH NOSE AND MANUFACTURING PROCESS OF A NOSE

(71) Applicant: DALLARA AUTOMOBILI S.P.A., Varano Dè Melegari (IT)

(72) Inventor: Luca Vescovi, Parma (IT)

(73) Assignee: DALLARA AUTOMOBILI S.P.A., Varano dè Melegari (IT)

( * ) Notice: Subject to any disclaimer, the term of this patent is extended or adjusted under 35 U.S.C. 154(b) by 157 days.

(21) Appl. No.: 18/254,588

(22) PCT Filed: Jun. 30, 2021

(86) PCT No.: PCT/IB2021/055864
§ 371 (c)(1),
(2) Date: May 25, 2023

(87) PCT Pub. No.: WO2023/275597
PCT Pub. Date: Jan. 5, 2023

(65) Prior Publication Data
US 2024/0001995 A1 Jan. 4, 2024

(51) Int. Cl.
| *B62D 25/08* | (2006.01) |
| *B29C 70/44* | (2006.01) |
| *B62D 35/00* | (2006.01) |
| *B29L 31/30* | (2006.01) |

(52) U.S. Cl.
CPC ............ *B62D 25/08* (2013.01); *B29C 70/446* (2013.01); *B29L 2031/3005* (2013.01); *B62D 35/00* (2013.01)

(58) Field of Classification Search
CPC ...... B62D 35/00; B62D 35/005; B62D 37/02; B62D 25/08; Y02T 10/82

USPC ..................... 296/181.5, 180.1; D12/88, 181
See application file for complete search history.

(56) References Cited

U.S. PATENT DOCUMENTS

| | | | | | |
|---|---|---|---|---|---|
| D225,353 S | * | 12/1972 | Broadley | ........................ | D12/88 |
| 4,789,117 A | * | 12/1988 | Paterson | ................ | F42B 10/22 296/180.1 |
| 6,059,353 A | * | 5/2000 | Whitman | ............... | B62D 21/12 296/180.1 |
| 6,276,636 B1 | | 8/2001 | Krastel | | |
| D630,552 S | * | 1/2011 | Tombazis | ........................ | D12/88 |
| D643,780 S | * | 8/2011 | Antao | ............................ | D12/88 |
| D644,146 S | * | 8/2011 | Ganassi | ........................ | D12/88 |

(Continued)

FOREIGN PATENT DOCUMENTS

| | | |
|---|---|---|
| JP | 2006306220 A | 11/2006 |
| JP | 2009226656 A | 10/2008 |
| WO | 20100113049 A2 | 10/2010 |

OTHER PUBLICATIONS

Office Action received in Japanese Application No. JP2023-520360, dated Apr. 3, 2025.

(Continued)

*Primary Examiner* — Gregory A Blankenship
(74) *Attorney, Agent, or Firm* — Paul G. Johnson; Maschoff Brennan

(57) ABSTRACT

A nose for a racing car may include, a shell having a prevalent extension between a first end and a second end along a longitudinal direction and so shaped that, in a section that is transverse to the longitudinal direction, it has a perimeter profile defining a plurality of lobes.

8 Claims, 8 Drawing Sheets

(56)            References Cited

U.S. PATENT DOCUMENTS

| | | | | | |
|---|---|---|---|---|---|
| D729,696 S | * | 5/2015 | Bowlby | .......................... | D12/88 |
| D732,426 S | * | 6/2015 | Bowlby | .......................... | D12/88 |
| D830,902 S | * | 10/2018 | Manzoni | ........................ | D12/92 |
| D830,904 S | * | 10/2018 | Jin | ................................. | D12/92 |
| D856,193 S | * | 8/2019 | Nurnberger | .................... | D12/88 |
| D874,977 S | * | 2/2020 | Bischoff | ........................ | D12/88 |
| D897,239 S | * | 9/2020 | Binotto | ........................... | D12/88 |
| D955,292 S | * | 6/2022 | Taormina | ....................... | D12/92 |
| D978,722 S | * | 2/2023 | Binotto | ........................... | D12/88 |
| D1,046,686 S | * | 10/2024 | Cardile | ........................... | D12/92 |
| 2007/0235590 A1 | * | 10/2007 | Kokoshkin | ............. | B64C 21/10 |
| | | | | | 244/130 |
| 2012/0267828 A1 | | 10/2012 | Halford | | |
| 2013/0264785 A1 | | 10/2013 | Bullis | | |
| 2024/0001995 A1 | * | 1/2024 | Vescovi | ................ | B29C 70/446 |

OTHER PUBLICATIONS

International Search Report and Written Opinion as issued in connection with International Patent Application No. PCT/IB2021/055864, dated Mar. 29, 2022.

* cited by examiner

PRIOR ART

1

NOSE FOR A RACING CAR, RACING CAR COMPRISING SUCH NOSE AND MANUFACTURING PROCESS OF A NOSE

TECHNICAL FIELD

The object of the present invention is a nose for a racing car, a racing car comprising such a nose and a manufacturing process of a nose. The present invention is applied to the motor sport sector.

BACKGROUND

As is known, the nose of a racing car is a structural component fitted to the front part of the chassis that performs different functions inside the car system. First of all, the nose increases safety because it permits the absorption of the energy of the car in the event of a head-on collision, protecting the chassis and driver. Further, it supports the aerodynamic loads of the front wing.

All the noses made of composite material that are currently used are components of tubular shape in which the inertia of the section is reached by using a "sandwich" laminated filler. A nose of known type is illustrated in FIGS. 1 and 2. A typically manual manufacturing process (lamination) is the result that is adapted to very low production volumes and with major costs linked to time and labour. The standards that the noses have to meet to be approved and thus used are set by the FIA (Fédération Internationale de l'Automobile-International Automobile Federation) and differ according to the type of championship. The component must meet the requirements of flexural rigidity, resistance and energy absorption. The component is approved by static tests (push offs) and dynamic tests (crash tests) that ensure the required safety and technical requirements.

The nose does not have to meet standards governing shape apart from the compliance with regulatory limits. The design must then be optimised as a function of style, performance and cost targets.

In order to meet the approval requirements, a low-density filler must be inserted that performs the task of stabilising the section, interposed between carbon plies (the so-called "first skin" and "second skin") with a thickness that is variable according to the structural purposes. This enables product inertia and consequently energy absorption to be increased.

The manufacturing process for obtaining a product of this type is lamination, which requires a series of operations.

Initially, resin models of the nose are made. Composite moulds are then made on these models.

After this, the first skin is laminated manually, layer by layer. This process is strictly manual and involves spreading layers of pre-impregnated fibre-reinforced composite materials (known in the trade as "prepreg") following the instructions on the orientation of the fibres and stacking provided by the design documents.

At set stages of the lamination process, intermediate compacting of the laminate occurs to ensure adhesion to the mould.

At the end of the manual lamination of the first skin, a baking bag is prepared and the semifinished product is subjected to a curing cycle in an autoclave. This cycle is variable according to the material, thickness and type of the component.

Following the curing cycle, the semifinished product is taken out of the autoclave and is prepared for the second lamination. In this step, the filler is deposited with adhesive film to favour gluing and possible metal components for fixings (inserts) interposed between the first and second skin.

After this, a manual lamination of the second skin takes place, exactly as occurs during lamination of the first skin. In the same manner, the semifinished product is placed in a baking bag and is subjected to a further curing cycle in the autoclave.

At the end of the second curing cycle, the component is removed from the mould and undergoes a finishing process (typically manual and assisted by CNC mechanical machining). It is thus ready for preassembly in the car.

The manufacturing process disclosed above has various problems. Above all, the process is typically manual and involves a considerable number of steps. It is accordingly hardly standardisable: the end product depends greatly on the skill of the operator making the end product. The result is poor repetitivity.

The process is further adapted to very low production volumes: the production rate is on average around 1.5 components a week per mould, i.e. production time is very long.

The possibility of error is thus high and greatly affects production. In particular, given the extremely low production rate, if the error occurs at a late stage of the process, product damage is huge.

Further, a lamination process as disclosed above entails high costs.

SUMMARY

A Nose for a racing car may include a shell having a prevalent extension between a first end and a second end along a longitudinal direction and so shaped that, in a section that is transverse to the longitudinal direction, it has a perimeter profile defining a plurality of lobes.

BRIEF DESCRIPTION OF DRAWINGS

Further characteristics and advantages of the present invention will become more apparent from the following indicative, and hence non-limiting, description of a preferred, but not exclusive, embodiment of a nose for a racing car and a racing car comprising such a nose, as illustrated in the appended drawings, in which.

DETAILED DESCRIPTION

Figure 1:
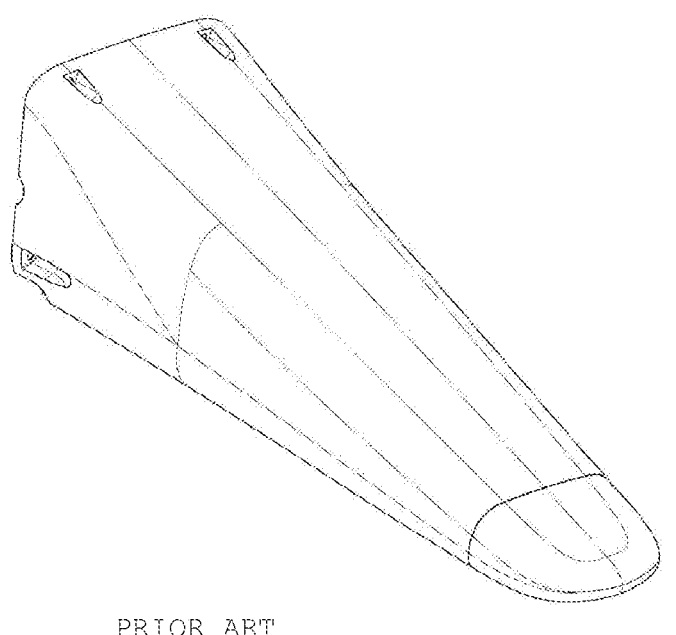
FIGS. 1 and 2 illustrate a nose of known type.
Figure 2:
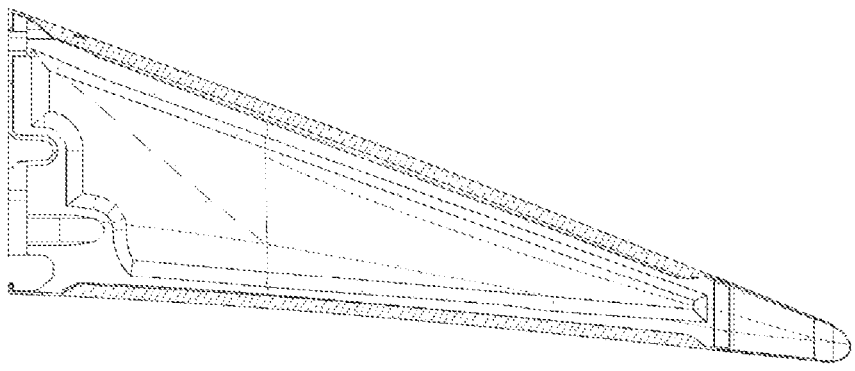
Figure 3:
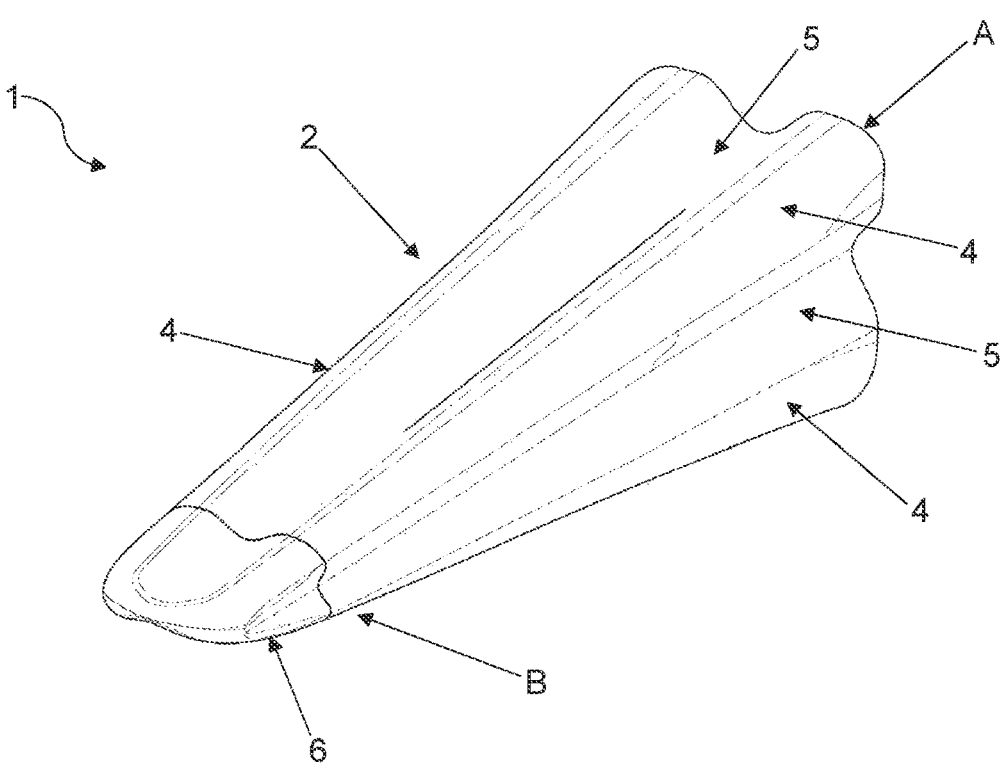
FIG. 3 illustrates a perspective view of the nose for a racing car, according to the present invention.
Figure 4:
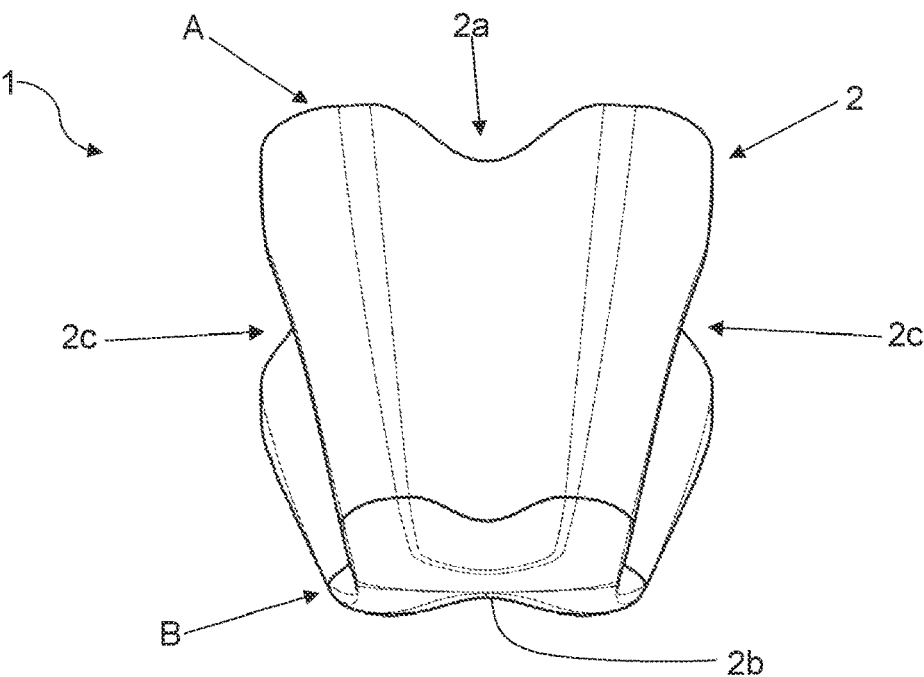
FIG. 4 illustrates a front view of the nose of FIG. 3.
Figure 5:
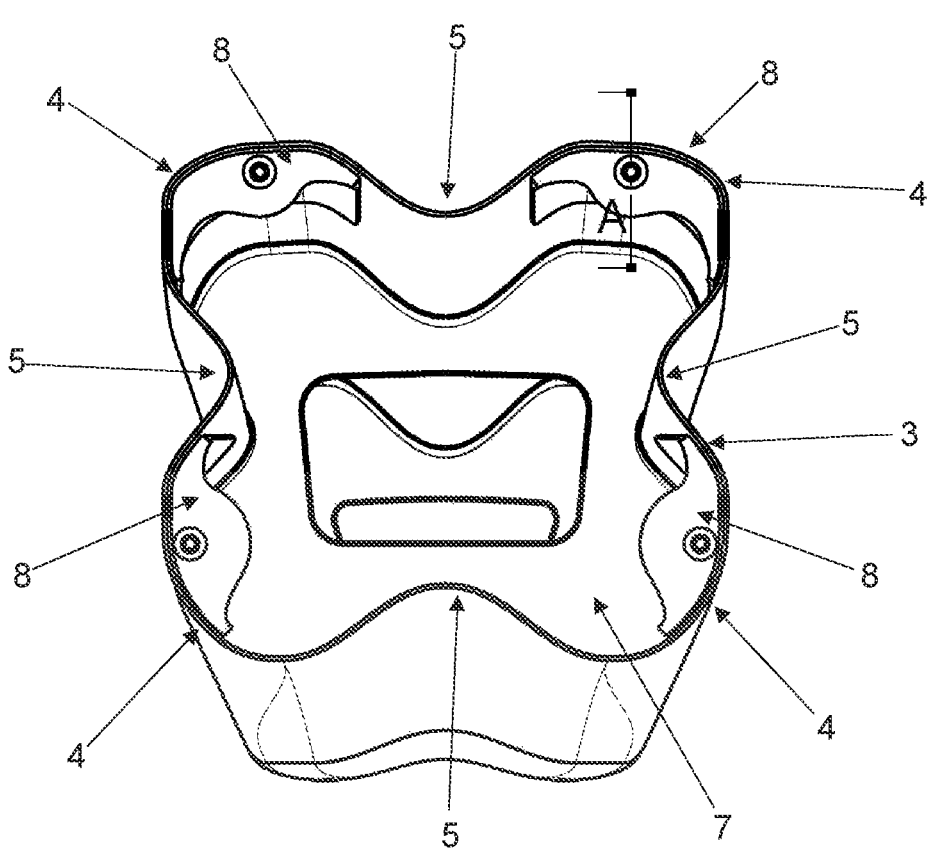
FIG. 5 illustrates a rear view of the nose of FIG. 3.
Figure 6:
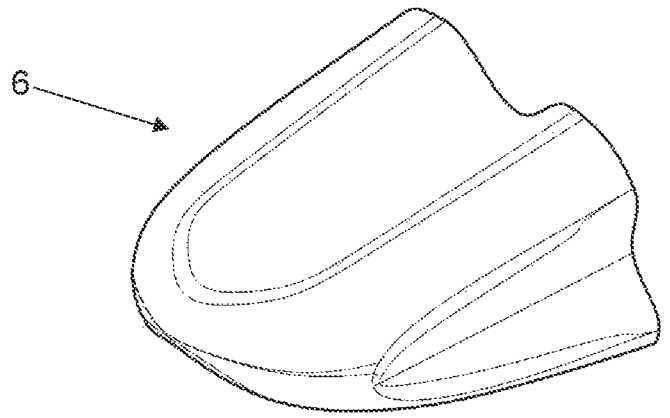
FIG. 6 illustrates a detail (tip) of the nose of FIG. 3.
Figure 7A:
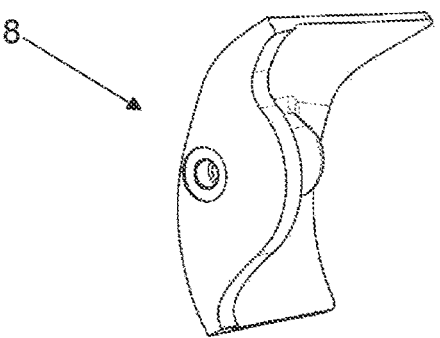
FIGS. 7a and 7b illustrate respectively a perspective view and front view of a detail (insert for fitting the nose to a racing car) of the nose of FIG. 3.
Figure 7B:
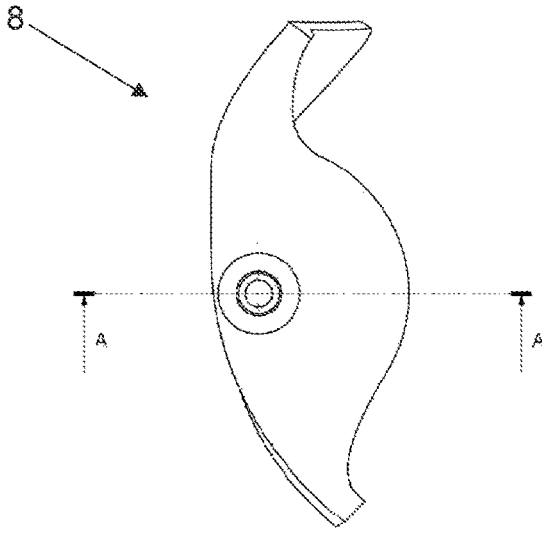
Figure 7C:
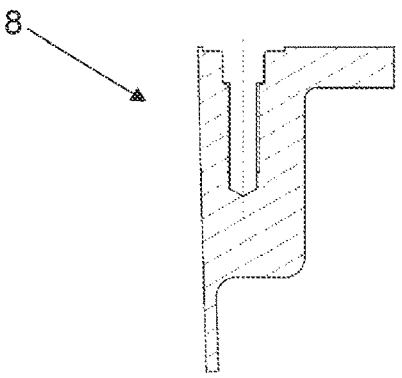
FIG. 7c illustrates a section view along the axis A-A of the insert of FIG. 7b.
Figure 8A:
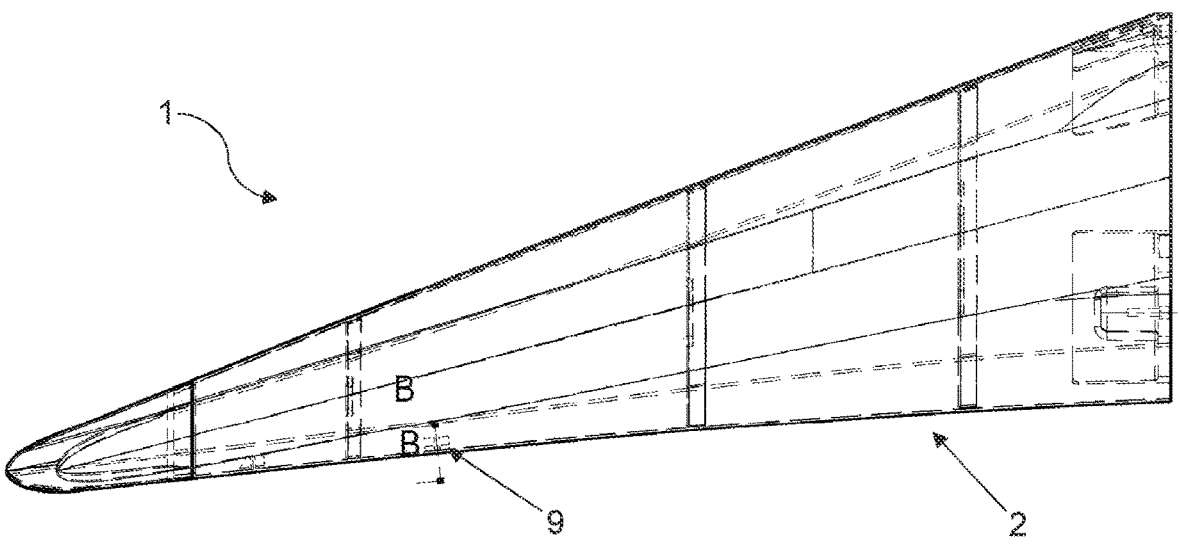
FIG. 8a illustrates a side view of the nose of FIG. 3.
Figure 8B:
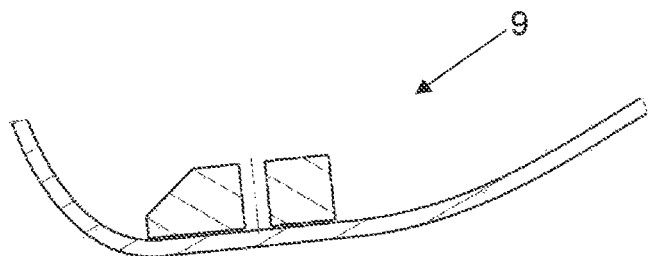
FIG. 8b illustrates a detail (insert for fixing wing) of the nose of FIG. 8a, in a sectioned view along the axis B-B.

In this context, the technical task underpinning the present invention is that of proposing a nose for a racing car, a racing car comprising such a nose and a manufacturing process of a nose which obviate the drawbacks of the prior art cited above.

In particular, the object of the present invention is to propose a nose for a racing car that is also achievable with a manufacturing process that is not completely manual, i.e. alternative to lamination.

Another object of the present invention is to make available a nose for a racing car that is achievable with a manufacturing process that is simpler than the prior art, lowering production times and costs of the end product whilst maintaining mechanical properties that are equivalent to those of noses of known type and complying with the technical and safety requirements set by the approval.

A further object of the present invention is to propose a nose for a racing car and a racing car comprising such a nose that are structurally simpler. Another object of the present invention is to make available a manufacturing process of a nose that is more streamlined and simpler and reduces production time compared with the prior art.

A further object of the present invention is to propose a manufacturing process of a nose that enables a nose to be produced with mechanical properties equivalent to those of noses of known type.

The proposed technical task and the specified objects are substantially achieved by a nose for a racing car, comprising a shell having a prevalent extension between a first end and a second end along a longitudinal direction. The shell is so shaped that in a section that is transverse to the longitudinal direction it has a perimeter profile defining a plurality of lobes.

Preferably, the perimeter profile defines an alternating sequence of a lobe and a valley.

In accordance with one embodiment, the lobes are four.

Preferably, the extension of the shell is such as to have a progressive section narrowing from the first to the second end.

Preferably, the nose comprises one or more reinforcing elements housed inside the shell.

In accordance with one embodiment, the shell is made of a single layer of composite material.

Preferably, the shell is hollow.

The stated technical task and specified objects are substantially achieved by a manufacturing process of a nose, comprising the steps of:

setting up a prelamination mould comprising two half moulds, at least one of which is movable towards/away from each other so as to define at least one open mould configuration, in which the two half moulds are moved away from one another, and a closed mould configuration, in which the two half moulds are moved towards one another. In the closed position, the prelamination mould defines a cavity comprising a plurality of grooves intended to define a corresponding plurality of lobes of the nose;

with the mould open, covering the two half moulds again, each with a layer of composite material consisting of a plurality of plies so as to form two halves of a nose shell;

after which, taking the mould into the closed configuration, bringing the half moulds towards each other so as to obtain a prelaminated product;

inserting a silicone bag inside the prelaminated product;

removing the prelaminated product with a bag inside from the prelamination mould;

setting up a press mould comprising at least one portion of fixed mould and a portion of movable mould so as to define at least one open mould configuration and a closed mould configuration. In the closed position the press mould defining a cavity comprising a plurality of grooves intended to define a corresponding plurality of lobes of the nose;

heating the press mould to a set temperature so as to enable the matrix of the composite to be polymerised;

with the mould open, positioning the prelaminated product on the fixed portion of mould;

closing the mould so as to compress the prelaminated product by a press;

introducing compressed air inside the silicone bag.

The prelaminated product is subjected on the one hand to the pressure arising from the closure of the mould of the press, on the other hand to the back pressure of the silicone bag, thus obtaining a shell of the nose. With reference to the figures, reference numeral 1 indicates a nose for a racing car.

The nose 1 comprises a shell 2. The shell 2 has a prevalent extension between a first end A and a second end B along a longitudinal direction. Preferably, the extension of the shell 2 is such as to have a section narrowing progressively from the first end A to the second end B. In other words, the shell 2 has an extension tapering along the longitudinal direction, i.e. has a cross section having gradually decreasing dimensions along the longitudinal direction.

Preferably, the shell 2 is hollow. The shell 2 delimits an inner environment. The shell 2 is originally so shaped that in a section that is transverse to the longitudinal direction it has a multi-lobe or petal-shaped perimeter profile 3, i.e. defining a plurality of lobes or petals 4. The lobes 4 extend along the shell 2.

A lobe 4 or petal means here a roundish projection. For example, the lobe 4 is substantially U or similarly shaped.

In the preferred embodiment, illustrated in figures, the lobes 4 are four. In this case, the shell 2 has a hollow section with a shape similar to a four-leaf clover but it is for example possible to provide a nose that is two-lobe, three-lobe, five-lobe, six-lobe and so on.

Preferably, the shell 2 comprises a plurality of valleys or depressions 5 interspersed at the lobes 4. In particular, the perimeter profile 3 has a trend that is such as to define an alternating sequence of a lobe 4 and of a depression 5. A depression 5 means here a recess or a hollow, i.e. a curve that recedes towards the longitudinal axis of the nose 1.

In other words, the perimeter profile 3 has a substantially curvilinear extension defined by a plurality of concavity changes.

With reference to an operating configuration of the nose 1, in which it is fitted to a racing car, the shell 2 has an upper surface 2a, a lower surface 2b and one or more side surfaces 2c.

In the embodiment described and illustrated here, the side surfaces 2c are two, each connects two corresponding ends of the upper 2a and lower 2b surfaces.

The lobes 4 are arranged at end zones of a surface 2a, 2b 2c of the shell 2. In particular, the lobes 4 are in the place of the meeting vertices between surfaces 2a, 2b, 2c. In other words, each surface 2a, 2b, 2c has two lobes 4 at opposite ends.

Each depression 5 is thus interposed between two consecutive lobes 4.

Preferably, the depression 5 is in a central zone of the surface 2a, 2b, 2c.

Preferably, the lobes 4 of the nose 1 have the same dimensions.

Preferably, the shell 2 is made of composite material. Preferably, the shell 2 is made of a single layer of composite material. In other words, the shell 2 is monolithic.

Advantageously, the thus shaped shell 2 is made by hot press moulding. This is not possible for prior art noses. Despite this, the shell 2 can anyway be made 2 by lamination, as occurs for the described prior art.

Preferably, the nose 1 comprises a tip 6 fitted to the shell 2 at the second end B. Preferably, the tip 6 is made of composite material. Preferably, the tip 6 is made by hot press moulding. Preferably, the tip 6 is made into a single layer of composite material. In other words, the tip 6 is monolithic Preferably, the nose 1 comprises one or more reinforcing elements 7 inserted inside the internal environment defined by the shell 2. These reinforcing elements 7 are known in the sector by the name of ribs and are used to provide the nose 1 with stability and rigidity. Preferably, the ribs 7 are glued to the shell 2. Preferably, the rib 7 is made of a single layer of composite material. In other words, the rib 7 is monolithic In the embodiment described and illustrated here, the ribs 7 are plates made of composite material. These plates have a perimeter trend that is such as to have a plurality of lobes 7a.

Preferably, the ribs 7 are complementary to the shell 2 so as to follow the trend thereof.

Preferably, the ribs 7 have a hollow central zone 7b.

Preferably, the ribs 7 are arranged in sequence along the longitudinal direction of the shell 2, inside the shell 2. If the shell 2 has a progressively narrowing section extension, the plates 7 are made of different dimensions so as to assist this extension.

In the preferred embodiment, illustrated in the figures, the ribs 7 are three. Preferably, the plates 7 have an extension on planes that are tilted with respect to the longitudinal direction. In particular, if the nose 1 extends prevalently horizontally, the ribs 7 have a vertical extension.

Preferably, the nose 1 comprises coupling means 8 for coupling with a chassis of the car. The coupling means 8 is arranged at the first end A. Preferably, the coupling means 8 comprises one or more inserts arranged at and inside the lobes 4. Preferably, the inserts are made of metal material. Preferably, the inserts are made of aluminium. Preferably, the inserts are made with the typical technologies for processing metal, for example CNC, melting.

Preferably, the nose 1 comprises a fixing means for fixing a wing of the car. Preferably, the fixing means is arranged near the second end B. Preferably, the fixing means 9 comprises one or more inserts arranged on the lower surface 2b. Preferably, the inserts are made of metal material. Preferably, the inserts are made of aluminium.

The object of the present invention is a racing car. The racing car comprises a nose 1 as described above.

A manufacturing process of a nose 1 for a racing car, according to the present invention, is described below.

The manufacturing process of the nose 1 mainly consists of two macro steps: a prelamination step and a subsequent hot press moulding step.

In the prelamination step, a prelamination mould 11 is so shaped that in a closed configuration it comprises a cavity 12 having a longitudinal extension. In a section that is transverse to the longitudinal direction, the cavity 12 comprises pluralities of grooves 13. The grooves are intended to define a corresponding plurality of lobes 4 of the nose 1. The grooves 13 have an extension along directions parallel to the longitudinal direction.

The cavity 22 has an extension that is such as to have a section narrowing progressively along the longitudinal direction. In other words, the cavity 12 has a tapered extension along the longitudinal direction, i.e. it has a cross section having dimensions gradually decreasing along the longitudinal direction.

Preferably, the cavity 12 has a profile that is such as to define an alternating sequence of a groove 13 and of a projection 14. The projection 14 enables a valley 5 of the nose 1 to be obtained. A projection 14 is defined here as a portion of the mould that extends to a central zone of the cavity 12.

The cavity 12 of the prelamination mould 11 is complementary to the desired shape of nose 1.

During the prelamination step, a plurality of plies are applied to the cavity 12 of the prelamination mould 11 so as to obtain a prelaminated product. The prelaminated product is thus a product in an intermediate, semifinished state.

Preferably, the prelamination mould 11 comprises two half moulds, at least one of which is movable towards/away from the other one so as to define at least one open mould configuration, in which the two half moulds are moved away from one another, and a closed mould configuration, in which the two half moulds are moved towards one another. In the closed mould configuration, the two half moulds define the aforesaid cavity.

In particular, plies are so applied to each half mould as to obtain two distinct halves of the prelaminated product. The two half moulds are then closed, moving together the two halves and obtaining the prelaminated product.

Figure 9:
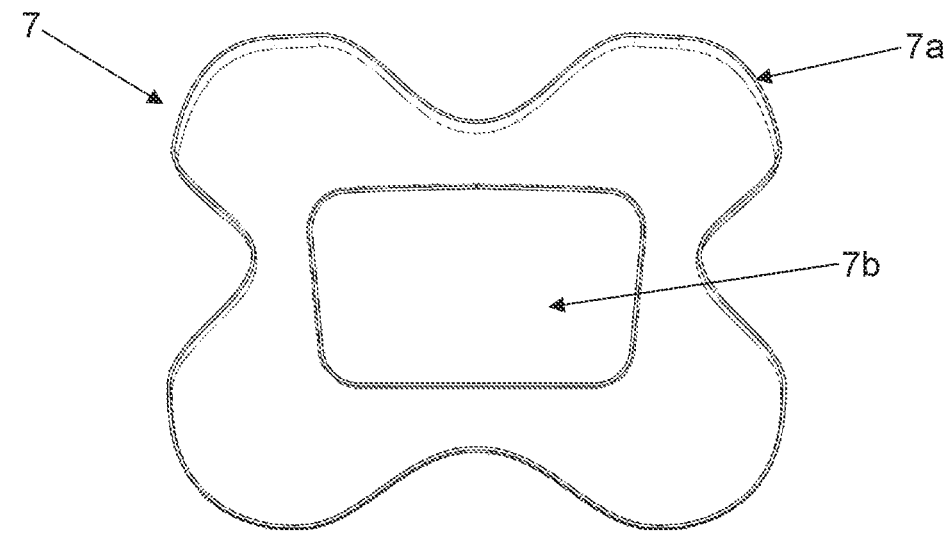
FIG. 9 illustrates a front view of a detail (rib) of the nose of FIG. 3.
Figure 10:
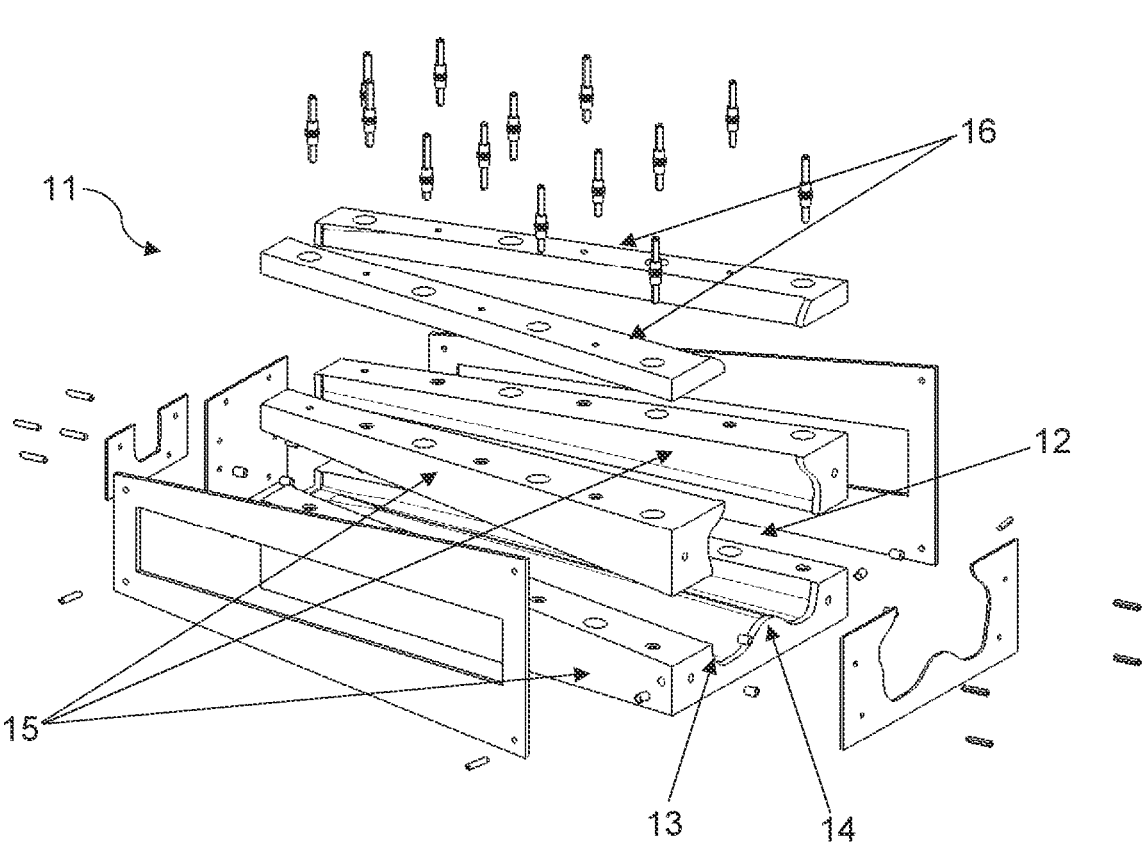
FIG. 10 illustrates an exploded view of a portion of a prelamination mould.
Figure 11:
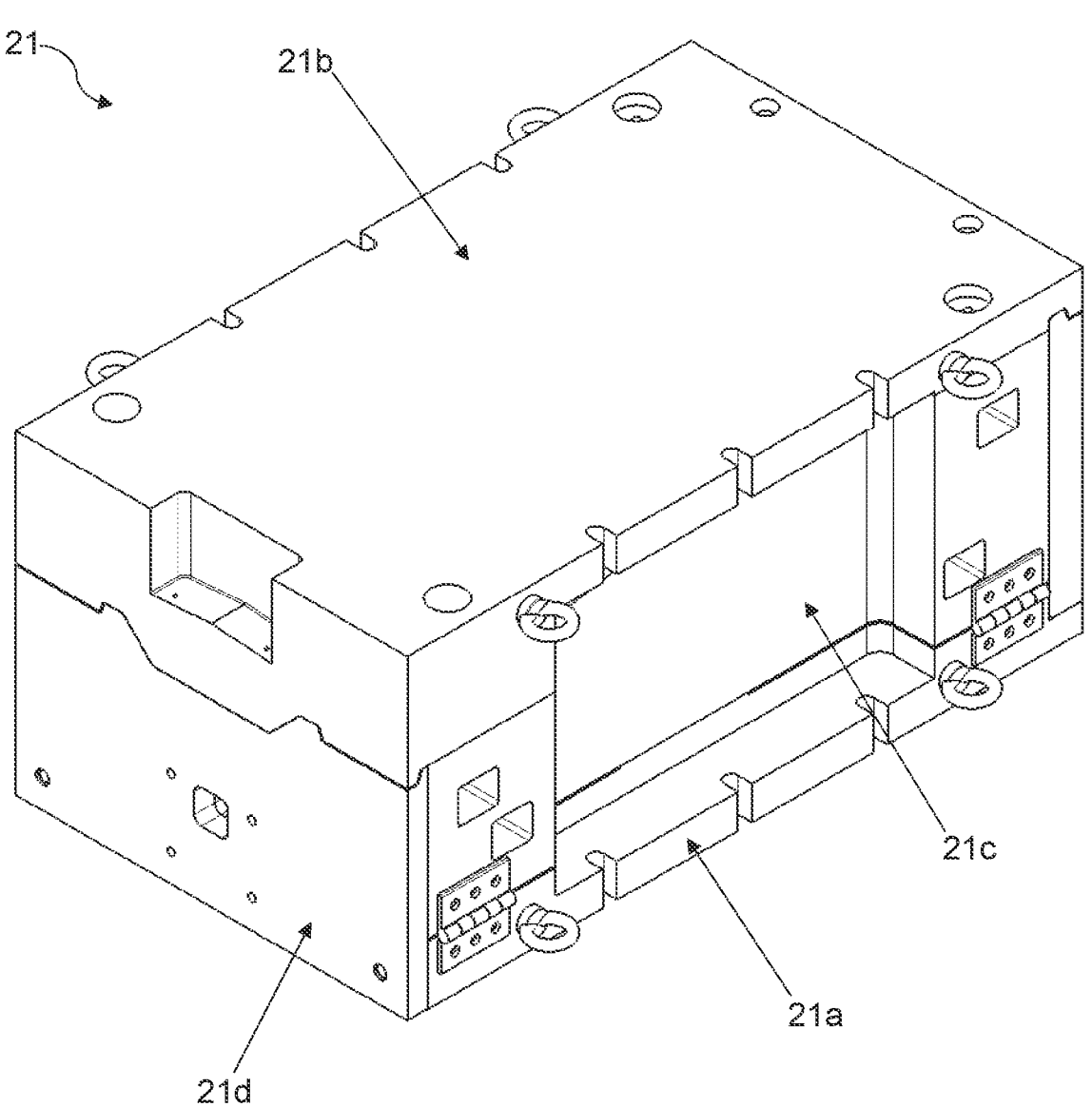
FIG. 11 illustrates a perspective view of a press mould in a closed configuration.
Figure 12:
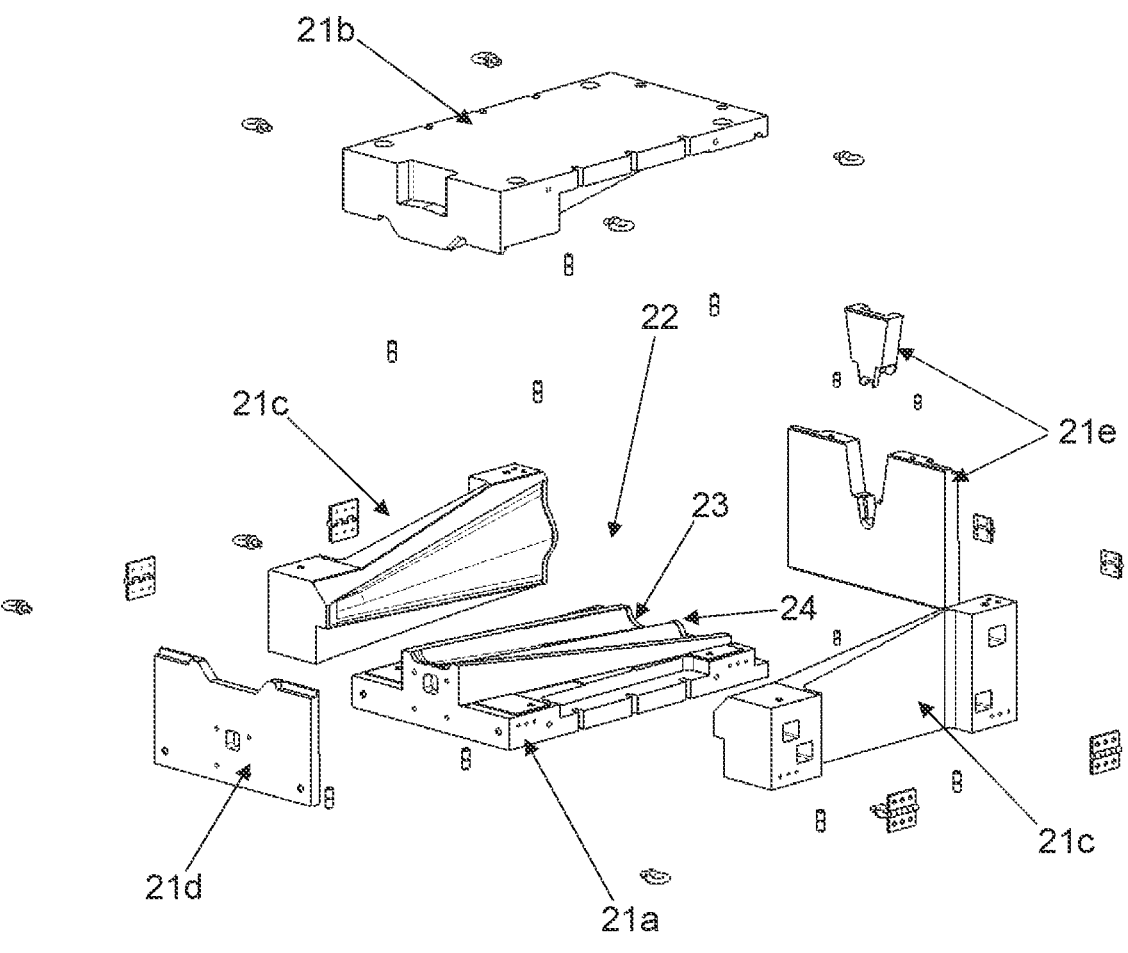
FIG. 12 illustrates an exploded view of the mould of FIG. 11.

Preferably, each half mould comprises several assembled moulds 15. FIG. 9 illustrates in this regard one of the two half moulds. In this manner, it is possible to adapt easily the shape of the prelamination mould 11 to the desired shape of the nose 1.

A half mould means here a portion that is part of a mould, it is not limited to meaning the exact half of a mould.

Preferably, shim elements 16 can be applied to the modules of the half moulds. The latter enable longer skins to be laminated. This is used to facilitate the joint between the two halves once the moulds are closed. They are removed when the half moulds are closed.

The prelaminated product obtained in the prelamination step is substantially a shell of multiple lobe type. As such, the shell is hollow.

Once the prelaminated product is obtained, a silicone bag is inserted inside the environment defined by the hollow shell.

After this, the prelaminated product with the silicone bag inside is removed from the prelamination mould 11.

The prelaminated product can be stored in a refrigeration cell for future use or be directly used in the subsequent step.

Following the prelamination step, the process comprises the step of hot press moulding.

The prelaminated product is placed in a press mould 21. Similarly to the prelamination mould 11, the press mould 21 is so shaped that in a closed configuration it comprises a longitudinal cavity 22 that, in a section that is transverse to the longitudinal direction, comprises a plurality of grooves 23. The grooves 23 are intended to define a corresponding plurality of lobes 4 of the nose 1. The grooves 23 have an extension along directions parallel to the longitudinal direction.

The cavity 22 has an extension that is such as to have a section narrowing progressively along the longitudinal direction. In other words, the cavity 22 has a tapered extension along the longitudinal direction, i.e. it has a cross section having dimensions gradually decreasing along the longitudinal direction.

Preferably, the cavity 22 has a profile that is such as to define an alternating sequence of a groove 23 and of a projection 24. The projection 24 enables a valley 5 of the nose 1 to be obtained. A projection 24 means here as a portion of the mould that projects towards a central zone of the cavity 22.

The cavity 22 of the press mould 21 is complementary to the desired shape of nose 1.

Once the prelaminated product has been positioned in the mould, the process comprises the step of so closing the mould 21 as to compress the prelaminated product by a press.

Once the prelaminated product has been positioned in the mould, the process comprises the step of introducing compressed air inside the silicone bag.

In this case, the plies on the one hand are subjected to the pressure coming from the closure of the mould of the press and on the other hand from the back pressure of the silicone bag.

The step of introducing compressed air and the step of closing the mould 21 can occur at least partially simultaneously or also one after the other.

In the preferred embodiment of the process, the step of introducing compressed air occurs after the step of closing the mould 21.

The process comprises the step of heating the surface of the press (and thus the moulds) to the temperatures necessary for polymerising the matrix of the compound.

In the preferred embodiment, the moulds are heated before the prelaminated product is positioned. In other words, the prelaminated product is positioned in an already heated mould.

In an alternative embodiment of the process, the moulds are heated after positioning of the prelaminated product.

Preferably, the press mould 21 comprises at least one fixed portion of mould and a movable portion of mould.

In the embodiment described and illustrated here, the press mould 21 comprises a lower mould 21a, an upper mould 21b, two side moulds 21c arranged on opposite sides of the lower mould 21a, a front mould 21d and a rear mould 21e. At least the lower mould 21a is fixed and the prelaminated product is positioned thereupon. Preferably, also the front mould 21d is fixed.

The upper 21b, side 21c and rear 21e moulds are on the other hand movable towards/away from the fixed moulds 21a, 21d. The moulds can be moved by translation or by rotation.

The undercuts of the geometry are managed with blocks that can be moved manually or automatically.

The upper mould 21b is solidly constrained to the movable plane of the press.

In the preferred embodiment, positioning of the prelaminated product and closing of the mould occurs in these steps:
  prelaminated positioning on open mould by positioning the product aligned on the lower mould and front mould 21a, 21d;
  (manual or automatic) movement by rotation on hinges of the side moulds 21c as far as closure;
  (manual or automatic) movement by rotation on hinges of the rear mould 21e as far as closure;

closure of upper mould 21b by movement of the plane of the press.

At the end of compression with heating, the mould 21 is opened and the product is removed. The silicone bag is removed from the product.

The product obtained following the hot press moulding step is the shell 2 of the nose 1.

Preferably, the shell 2 is then finished superficially, usually with manual operations and CNC mechanical processing.

Preferably, possible subcomponents such as a tip 6 of nose, ribs 7, inserts 8, 9, are glued to the shell 2. This gluing involves interposing positioning masks.

From the description given, the features are clear of the nose for a racing car, of the racing car comprising such a nose and the manufacturing process of a nose, according to the present invention, just as the advantages thereof are clear.

In particular, the multiple lobe shape of the nose enables a monolithic nose to be made, i.e. a nose consisting of a single carbon skin, without the need to resort to fillers. In other words, the new multiple lobe shape proposed here is specially designed to increase the inertia and stability of the section. This function is performed in known solutions by the filler. Optimization of the shape has been obtained through an interactive finite element analysis (FEA) process, the purpose of which was to minimise the response in frequency of the nose when subjected to the energy absorption (crash) test. By perfecting the frequency response of the structure (FRF of the system subjected to the external forcing due to the shock, thus the system modes as a function of the buckling modes due to the stress that the system receives) stabilisation of the structure is obtained and consequent optimisation of the energy absorption properties. The resistant section of the nose has been obtained by reaching a compromise between simplicity of design and performance (obtained interactively with FEA analysis) and thus changes from being circular or oval (typical or known noses) to being four-lobed (petal or four-leaf clover). This shape enables a monolith nose to be made with a stable structure with high energy absorption.

The manufacturing process described above is usable only thanks to the new geometry proposed by the present invention. Such a process is not usable in any way for noses of known type. The new multiple lobed shape thus enables a move from a completely manual process that is adapted to low production volumes (lamination) to a process that can be automated and is adapted to medium production volumes (hot press moulding), maintaining the same mechanical properties as for the noses produced by lamination. This brings a series of advantages: increase in production volumes, streamlining of the manufacturing process, lowering of production times and costs and increase of process stability. It should be considered that the average time for making a prior art nose by lamination is around 30 hours. Making the nose according to the present invention requires about 4 hours.

Further, in the known process for making noses, the inserts for fixing to the chassis or for fixing the wings of the car necessarily have to be inserted into lamination between the first and second skin, greatly complicating and significantly increasing production time. On the other hand, with the nose proposed here, the inserts are glued after the shell of the nose has been made.

Further, the nose according to the present invention is also markable with lamination technology. In this case, there is a process that is anyway more efficient than that used for making prior art noses.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"): the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possi-bilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in under-standing the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the present invention.

The invention claimed is:

1. A nose for a racing car, comprising a shell extending between a first end and a second end along a longitudinal direction, shaped such that in a section transverse to said longitudinal direction, the shell has a perimeter profile defining a plurality of valleys interspersed between a plurality of lobes in an alternating sequence.

2. The nose according to claim 1, wherein a number of the lobes are four.

3. The nose according to claim 1, wherein the extension of the shell is such as to have a progressive section narrowing from the first to the second end.

4. The nose according to claim 1, comprising one or more reinforcing elements housed inside the shell.

5. The nose according to claim 1, wherein the shell is made of a single layer of composite material.

6. The nose according to claim 1, wherein the shell is a hollow shell.

7. A racing car comprising a nose according to claim 1.

8. A racing car comprising a nose according to claim 3.

* * * * *